(12) United States Patent
Lee et al.

(10) Patent No.: US 8,040,325 B2
(45) Date of Patent: Oct. 18, 2011

(54) BASE CAPACITANCE COMPENSATION FOR A TOUCHPAD SENSOR

(75) Inventors: Wen-Kai Lee, Kaohsiung (TW); Kuan-Chun Tang, Toufen Township, Miaoli County (TW)

(73) Assignee: Elan Microelectronics Corporation, Hsinchu (TW)

( * ) Notice: Subject to any disclaimer, the term of this patent is extended or adjusted under 35 U.S.C. 154(b) by 1138 days.

(21) Appl. No.: 11/541,693

(22) Filed: Oct. 3, 2006

(65) Prior Publication Data
US 2007/0079996 A1    Apr. 12, 2007

(30) Foreign Application Priority Data
Oct. 7, 2005    (TW) ............................... 94135250 A (51) Int. Cl.
*G09G 5/00*    (2006.01)
(52) U.S. Cl. ..................... 345/173; 345/174; 178/18.06
(58) Field of Classification Search .......... 345/173–179; 178/18.01–18.11
See application file for complete search history.

(56) References Cited

U.S. PATENT DOCUMENTS
5,495,077 A * 2/1996 Miller et al. ............... 178/18.06
2004/0252109 A1 * 12/2004 Trent et al. .................... 345/174
* cited by examiner

*Primary Examiner* — Regina Liang
(74) *Attorney, Agent, or Firm* — Rosenberg, Klein & Lee (57) ABSTRACT

Methods are provided for base capacitance compensation of traces in a touchpad sensor. Compensation areas are calculated by evaluating the differences between the base capacitances of the traces, or the differences between the base capacitances of the traces and a target value. The compensation areas are electrically connected to respective traces to equalize the base capacitances of the traces. Alternatively, a relationship between the areas of the traces and the distances from the traces to a grounding layer for equalizing the base capacitances of the traces is derived and from which the areas of the traces or the position of the grounding layer are adjusted.

36 Claims, 10 Drawing Sheets

BASE CAPACITANCE COMPENSATION FOR A TOUCHPAD SENSOR

FIELD OF THE INVENTION

The present invention is related generally to a touchpad and, more particularly, to a base capacitance compensation for a touchpad sensor.

BACKGROUND OF THE INVENTION

Figure 1:
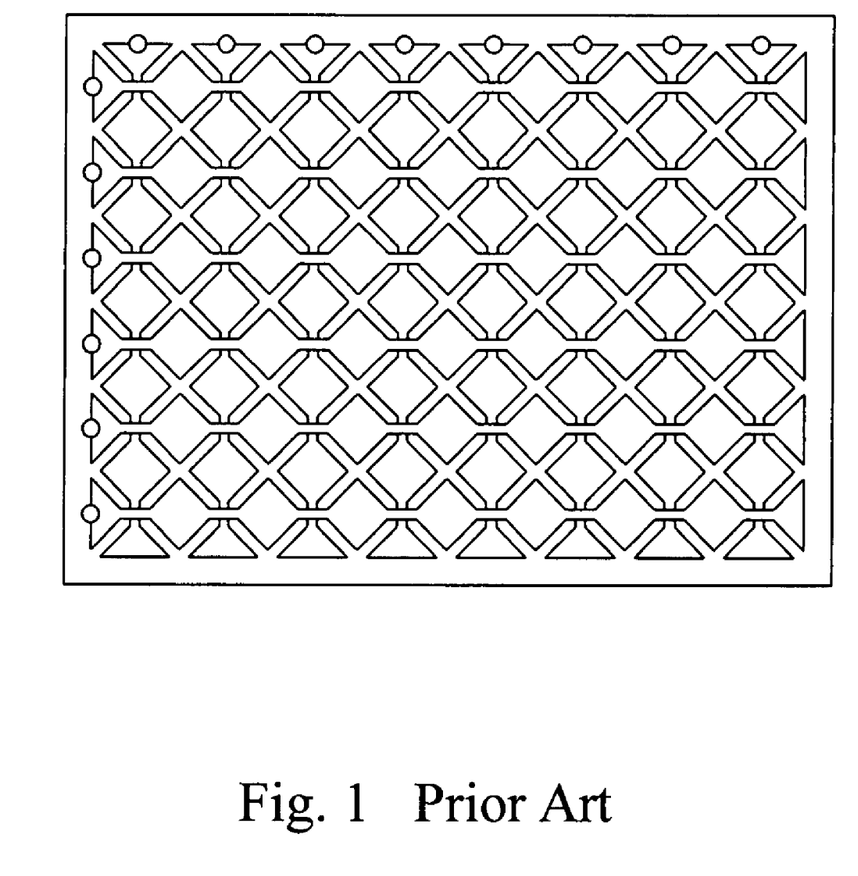
FIG. 1 shows a top view of a square touchpad sensor.
Figure 2:
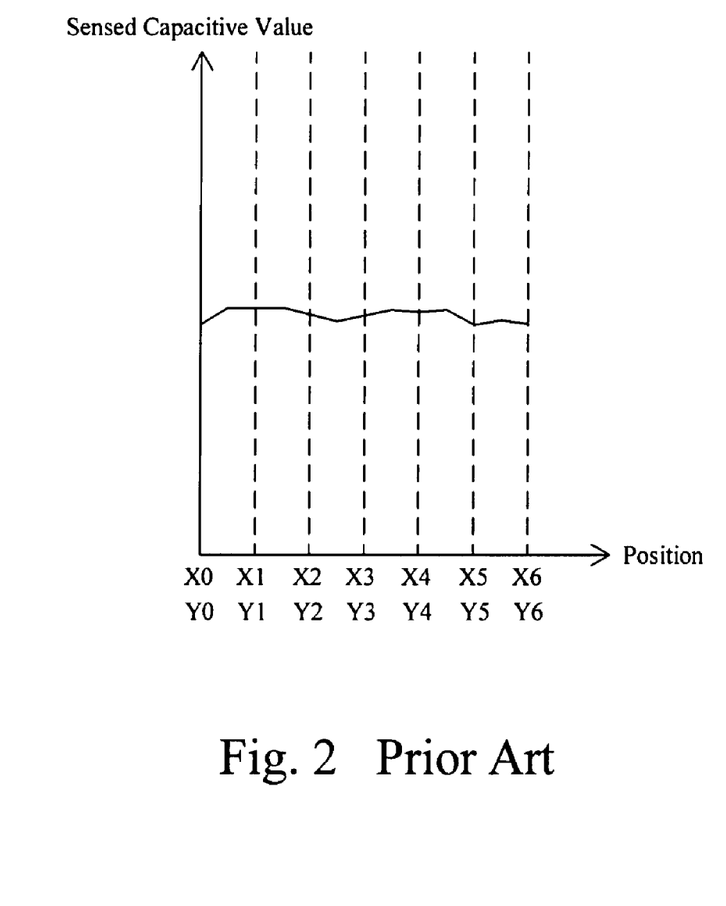
FIG. 2 shows a relationship of the sensed capacitive values caused by an object with the position across the touchpad sensor of FIG. 1.

Due to the compactness, low cost, low power consumption and long lifetime, touchpad has been widely used in various electronic products, for example notebook computer, personal digital assistant (PDA), mobile phone and other electronic systems. Touchpad serves as an input device where users could touch or slide thereon by an object, for example finger or fingers, to control the cursor on a window in relative movement or absolute coordinate movement to support various input functions such as text writing, window scrolling and button pressing. Conventionally, the sensor of a touchpad has symmetrical structure such as the square shape shown in FIG. 1. The traces of the touchpad sensor all have same shape and area, and thus the base capacitances of the traces are symmetrically distributed across the touchpad sensor. The sensed capacitive values caused by an object touching on the touchpad sensor are also symmetrical and linear across the touchpad sensor as shown in FIG. 2. However, the shape and structure of a touchpad sensor would be changed with different applications and produces asymmetrical sensing characteristics accordingly. An asymmetrical touchpad sensor refers to one including at least one of the features of the touchpad sensor, such as the shape of the sensor, the thickness of each sensing layer in the sensor, the area of the traces, and the distances between the traces to the grounding layer, that is asymmetrical. In a touchpad sensor, the base capacitance of a trace is proportional to the area of the trace and the inverse of the distance between the trace and the grounding layer, or simply represented by $$C = \in \times (A/d) \quad [\text{Eq-1}]$$

where C is the base capacitance of the trace, $\in$ is the dielectric constant, A is the area of the trace, and d is the distance between the trace and the grounding layer. The sensed capacitive value of the trace caused by an object touching is $$S \propto (\Delta C/C) \quad [\text{Eq-2}]$$

where $\Delta C$ is the differential capacitance of the trace caused by the object touching. Therefore, the area of the trace and the distance between the trace and the grounding layer both are factors of determining the base capacitance of the trace. For example, in a circular touchpad sensor 100 shown in FIG. 3, the traces X0 to X6 along the horizontal direction have different lengths and different areas. From the equation Eq-1 it is concluded that, if all the traces of a touchpad sensor are spaced from a grounding layer with a same distance, the trace having greater area will have greater base capacitance. Accordingly, the base capacitances of the group of traces X0 to X6 and the group of traces Y0 to Y6 are asymmetrically distributed across the touchpad sensor 100. As illustrated by the equation Eq-2, when an object operating on the touchpad sensor 100, the sensed capacitive value S will vary with position across the touchpad sensor 100 as shown in FIG. 4, since the traces X0 to X6 and Y0 to Y6 of the touchpad sensor 100 have different base capacitances therebetween. The asymmetricity and nonlinearity of the sensed capacitive value S will cause the touchpad having misjudgment to an operation or undesired offset in the judged position to a touch of an object operating thereon.

Therefore, it is desired a compensation to a touchpad for uniform sensed capacitive values thereof.

SUMMARY OF THE INVENTION

An object of the present invention is directed to methods for base capacitance compensation for a touchpad sensor, such that the sensed capacitive values caused by the variance between the base capacitances of different traces in the touchpad sensor becomes uniform in response to the object operation with the touchpad sensor.

In a compensation for a touchpad sensor, according to the present invention, the base capacitances of the traces in the touchpad sensor are calculated, the differences between the base capacitances of the traces are further calculated, the compensation areas for the traces which have less base capacitances are calculated from the differences, and the compensation areas are electrically connected to the respective traces.

Alternatively, in a compensation for a touchpad sensor according to the present invention, the base capacitances of the traces in the touchpad sensor are calculated, the differences between the base capacitances of the traces and a target value are calculated, the compensation areas for the traces are calculated from the differences, and the compensation areas are electrically connected to the respective traces.

Yet in a compensation for a touchpad sensor according to the present invention, the base capacitances of the traces in different sensing layers of the touchpad sensor are calculated, a relationship between the areas of the traces and the distances from the traces to a grounding layer for equalizing the base capacitances of the traces is derived, and the areas of the traces or the position of the grounding layer are adjusted based on the relationship.

In a touchpad sensor, by compensating the traces with additional areas or adjusting the distances from the traces to a grounding layer, the traces in the same sensing layer or different sensing layers will have uniform base capacitances, and therefore the touchpad sensor can keep away from wrong decision of the finger operation thereon, or offset of the determined finger position thereon.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 5:
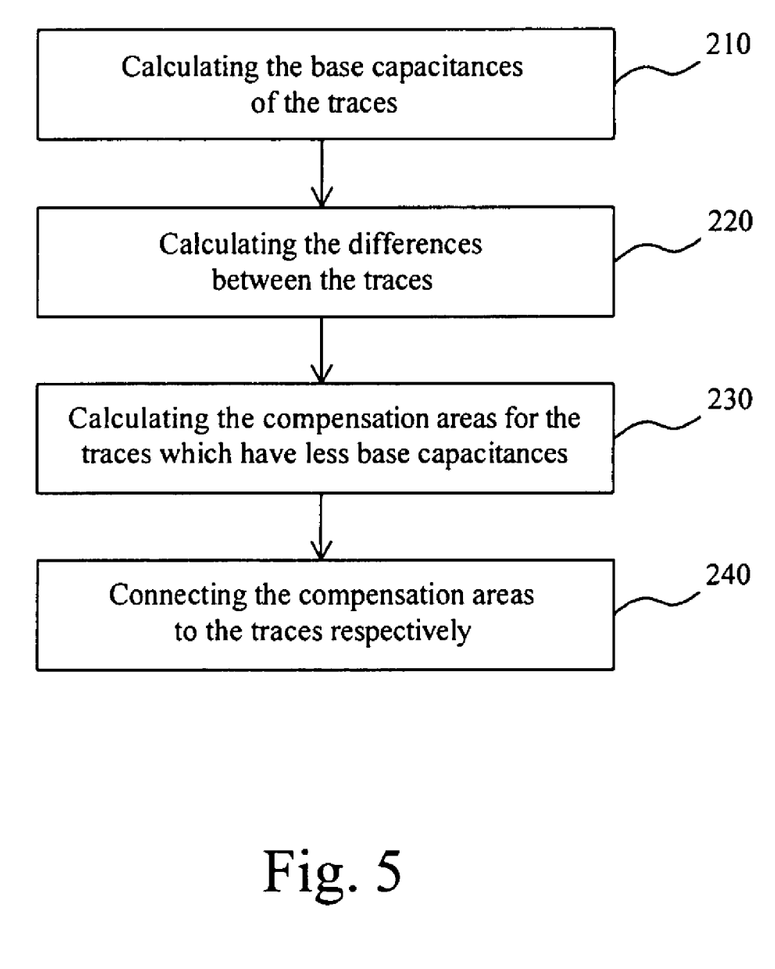
FIG. 5 shows a flowchart in a first embodiment according to the present invention.

FIG. 5 shows a first embodiment according to the present invention. In flowchart 200, step 210 calculates the base capacitances of the traces according to the equation Eq-1, for example C1 and C2 of two traces, step 220 calculates the differences between the base capacitances of the traces, for example $\Delta C = C1 - C2$, step 230 calculates the compensation areas for the traces which have less base capacitances from the differences of the base capacitances obtained in step 220, for example the compensation area $A0 = \Delta C \times (d0/\in)$ for the trace C2, where d0 is the distance between the compensation area and the grounding layer and $\in$ is the dielectric constant therebetween, and step 240 electrically connects the compensation area to the trace which have less base capacitance, respectively, for example the compensation area A0 to the trace C2. As a result, the touchpad sensor will have uniform base capacitances, for example $C1 = C2 + C_{A0} = C2 + \Delta C \times (d0/\in) = C2 + (C1-C2) \times (d0/\in)$. The trace as the compensation reference and the trace to be compensated, for example C1 and C2 in the above embodiment, may be in a same sensing layer or different sensing layers of a touchpad sensor. If the reference trace and the compensated trace are in different sensing layers, their directions are perpendicular to each other, for example an X trace and a Y trace of a touchpad sensor. In various embodiments, the compensation area A0 is in a device layer, the sensing layer including the reference trace, or the sensing layer including the compensated trace of a touchpad. If the compensation area A0 is in a device layer, the distance d0 between the compensation area A0 and the grounding layer is exactly the one between the device layer and the grounding layer of the touchpad. If the compensation area A0 is in the sensing layer including the reference trace, the distance d0 between the compensation area A0 and the grounding layer is exactly the one between the reference trace and the grounding layer of the touchpad. If the compensation area A0 is in the sensing layer including the compensated trace, the distance d0 is exactly the one between the compensated trace and the grounding layer of the touchpad.

Figure 3:
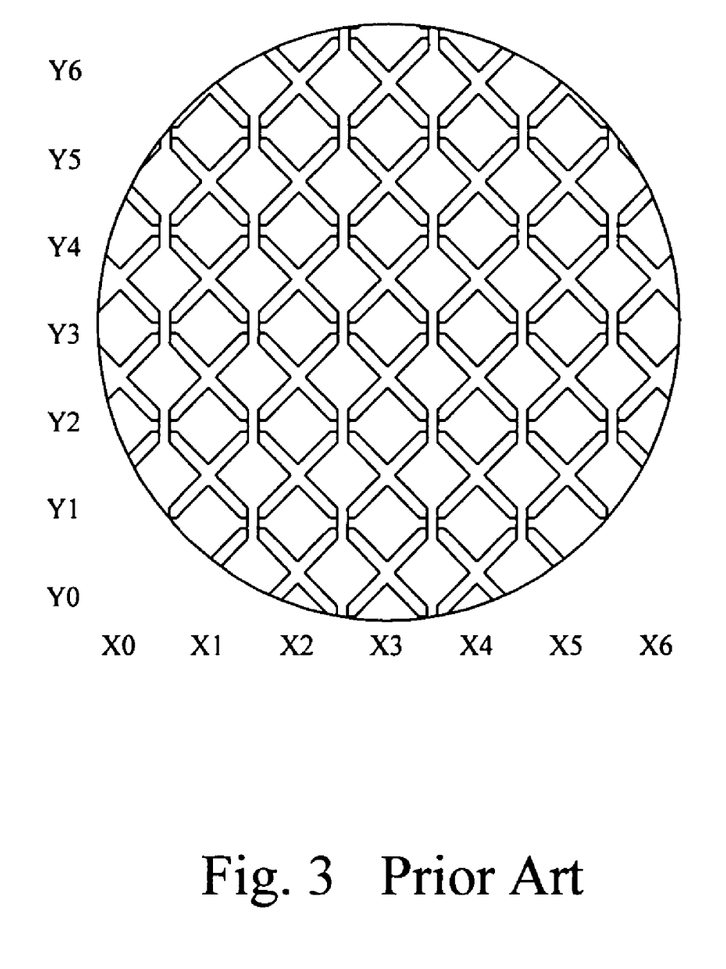
FIG. 3 shows a top view of a circular touchpad sensor.
Figure 4:
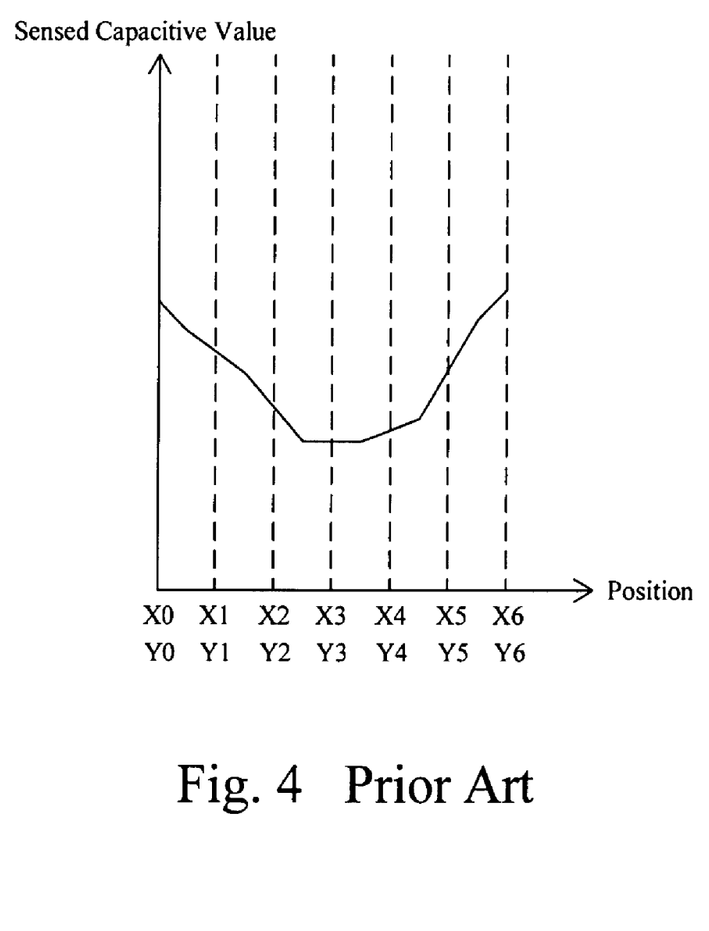
FIG. 4 shows a relationship of the sensed capacitive values caused by an object with the position across the touchpad sensor of FIG. 3.
Figure 6:
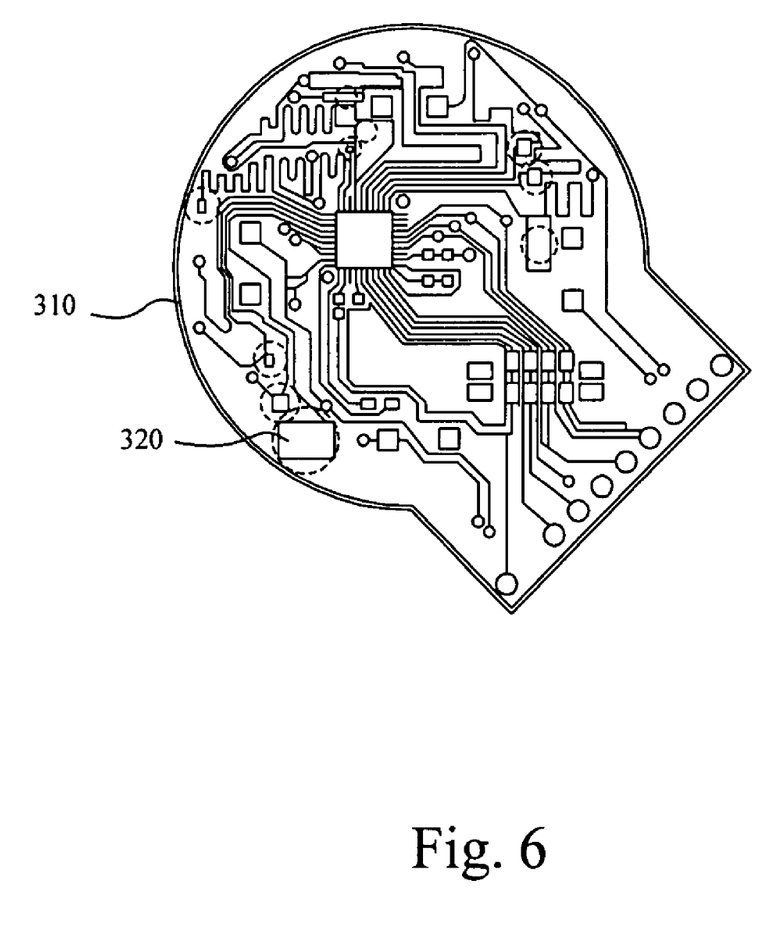
FIG. 6 shows a compensation area in a device layer of a circular touchpad sensor.

For example, in the circular touchpad sensor 100 show in FIG. 3, the group of traces X0 to X6 and the group of traces Y0 to Y6 are perpendicular to each other. From the equation Eq-1, the trace X0 has the base capacitance $C_{X0} = \in \times (A_{X0}/d_{X0})$, the trace X3 has the base capacitance $C_{X3} = \in \times (A_{X3}/d_{X3})$, the difference between the base capacitances $C_{X0}$ and $C_{X3}$ is $\Delta C = \in \times ((A_{X3}/d_{X3}) - (A_{X0}/d_{X0}))$, and the compensation area A0 will impart a base capacitance $C0 = \in \times (A0/d0)$, where d0 is the distance between the compensation area A0 and the grounding layer of the touchpad sensor 100, and $\in$ is the dielectric constant therebetween. To have $C0 = \Delta C$, i.e., $\in \times (A0/d0) = \in \times ((A_{X3}/d_{X3}) - (A_{X0}/d_{X0}))$, it is obtained $A0 = ((A_{X3}/d_{X3}) - (A_{X0}/d_{X0})) \times d0$. Electrically connecting the compensation area A0 to the trace X0 will compensate the base capacitance of the traces X0 to be substantially the same as that of the trace X3. With the same process to compensate the other traces one by one, for example X1 to X6 and Y0 to Y6, to equalize the base capacitances thereof, the touchpad sensor 100 will have symmetrical and linear sensed capacitive values in response to an object touching thereon. Alternatively, the compensation area is selected from a different layer, for example a device layer 310 as shown in FIG. 6, in which the compensation area 320 is a conductor region in the device layer 310 and is electrically connected to the compensated trace through the circuit layout.

Figure 7:
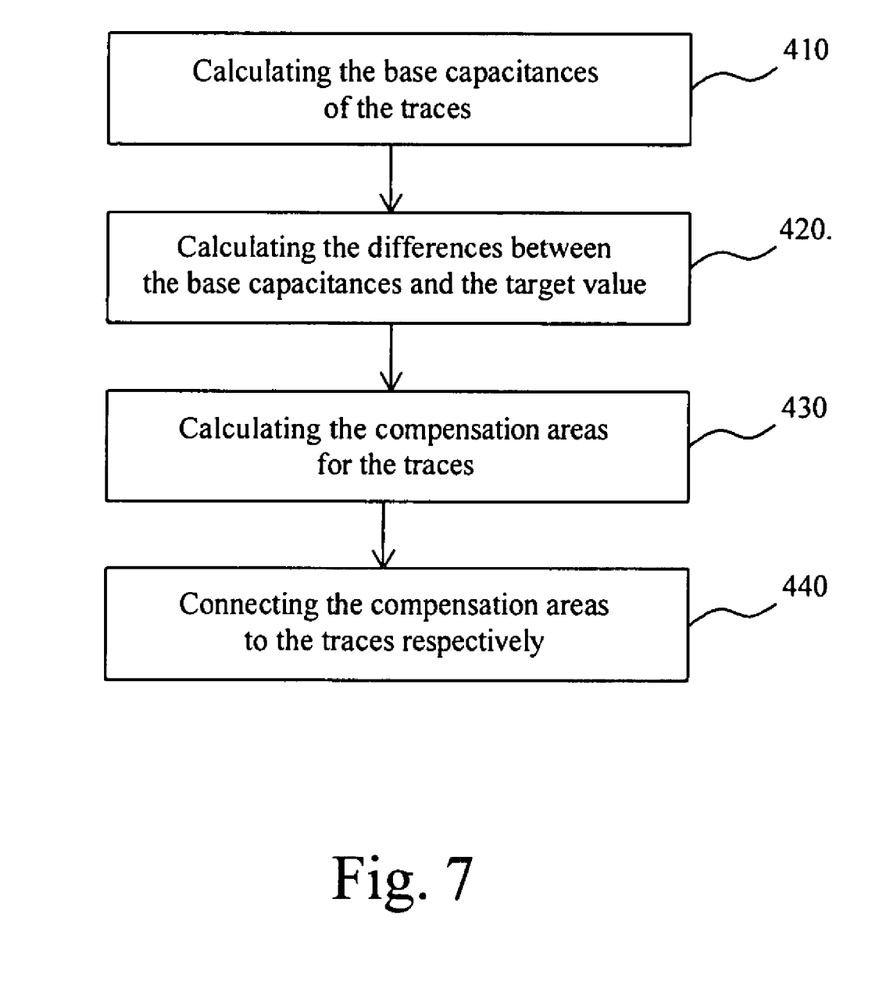
FIG. 7 shows a flowchart in a second embodiment according to the present invention.

FIG. 7 shows a second embodiment according to the present invention. In flowchart 400, step 410 calculates the base capacitances of the traces, for example C1 and C2 of two traces, according to the equation Eq-1, step 420 calculates the differences of the base capacitances between the traces and a target value respectively, for example $\Delta C1 = C_{target} - C1$ and $\Delta C2 = C_{target} - C2$, where $C_{target}$ is a predetermined target value, step 430 calculates the compensation areas for the traces from the differences obtained in step 420, for example $A1 = \Delta C1 \times (d1/\in)$ and $A2 = \Delta C2 \times (d2/\in)$ for the traces C1 and C2 respectively, where d1 and d2 are the distances between the grounding layer and the compensation areas A1 and A2 respectively, and $\in$ is the dielectric constant therebetween, and step 440 electrically connects the compensation areas to the corresponding traces respectively, for example the compensation area A1 to the trace C1 and the compensation area A2 to the trace C2. As a result, all the compensated traces will have the same base capacitances as the target value, for example $C_{target}$ in the above embodiment. The compensated traces may be in a same sensing layer or different sensing layers of a touchpad sensor. If the compensated traces are in different sensing layers, their directions are perpendicular to each other, for example an X trace and a Y trace of a touchpad sensor. The compensation areas A1 and A2 may be in a same layer or different layers of a touchpad, for example, both the compensation areas A1 and A2 in a same sensing layer or device layer, or the compensation area A1 in the sensing layer including the trace C1 and the compensation area A2 in the sensing layer including the trace C2, or the compensation area A1 in the sensing layer including the trace C2 and the compensation area A2 in the sensing layer including the trace C1.

Figure 8:
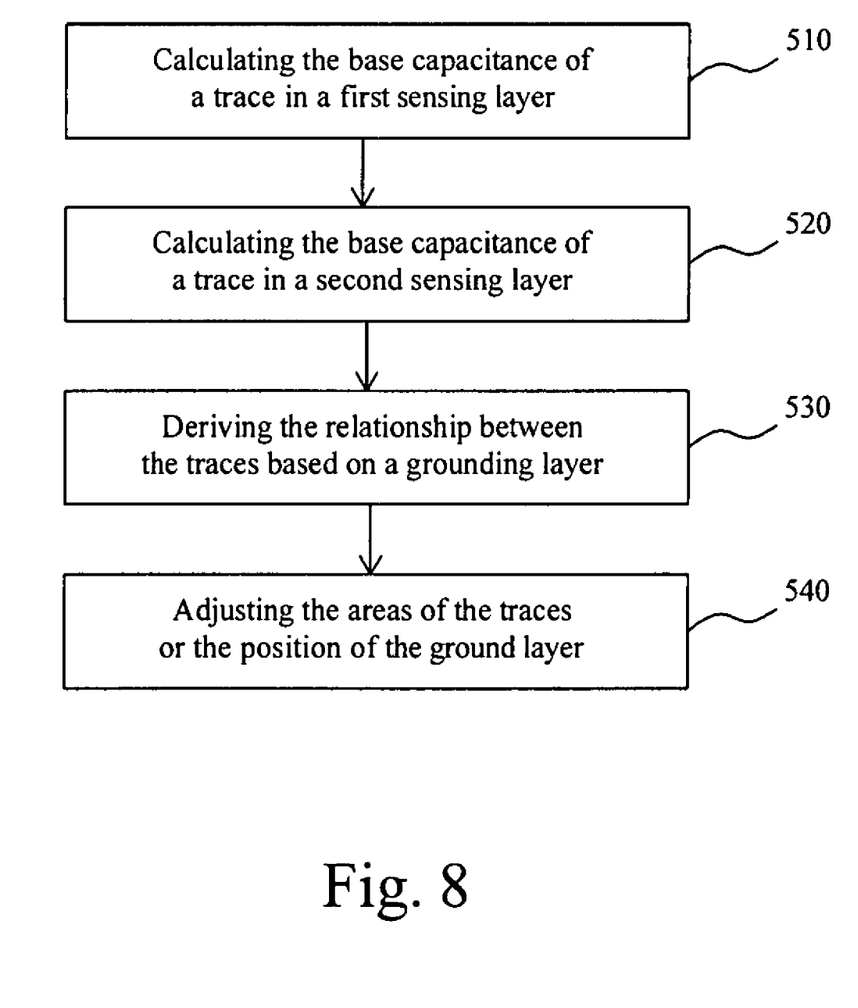
FIG. 8 shows a flowchart in a third embodiment according to the present invention.
Figure 9:
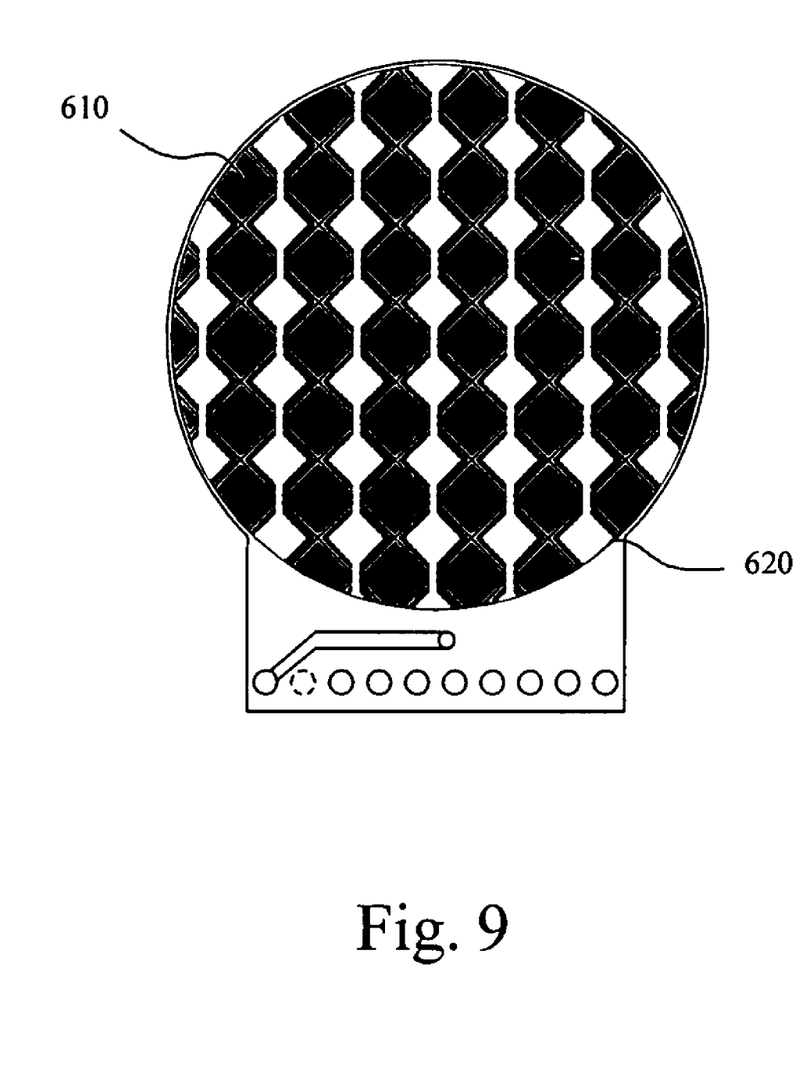
FIG. 9 shows a circular touchpad sensor compensated by the process shown in FIG. 8.
Figure 10:
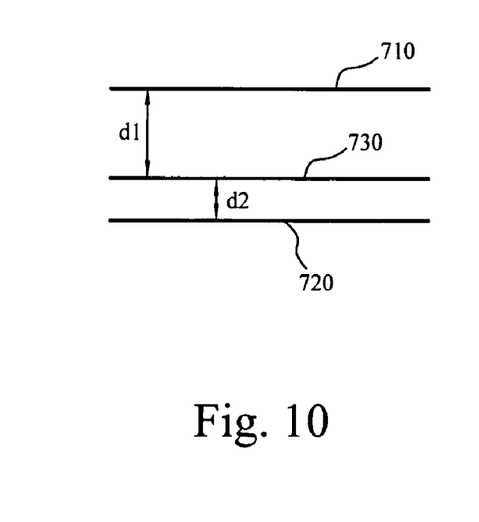
FIGS. 10 to 12 show three cross-sectional structures of the touchpad sensor compensated by the process shown in FIG. 8.
Figure 11:
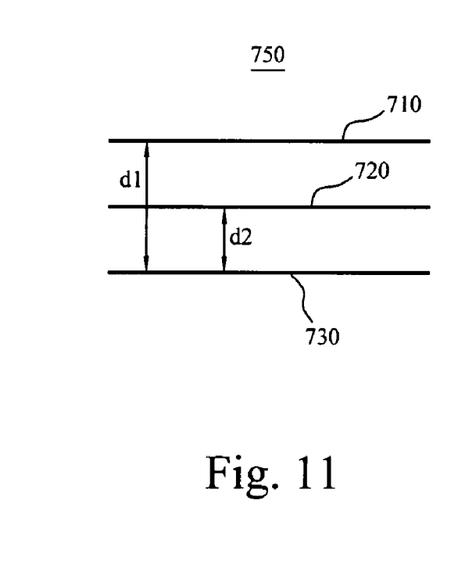
Figure 12:
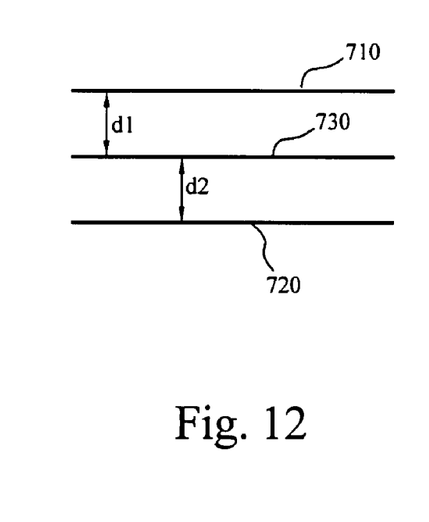

FIG. 8 shows a third embodiment according to the present invention. In flowchart 500, step 510 calculates the base capacitances of the traces in a first sensing layer according to the equation Eq-1, for example $C1 = \in \times (A1/d1)$ for a trace in the first sensing layer, where A1 is the area of this trace, $d_1$ is the distance between this trace and the grounding layer of the touchpad sensor, and $\in$ is the dielectric constant therebetween, step 520 calculates the base capacitances of the traces in a second sensing layer according to the equation Eq-1, for example $C2 = \in \times (A2/d2)$ for a trace in the second sensing layer, where A2 is the area of this trace, d2 is the distance between this trace and the grounding layer of the touchpad sensor, and $\in$ is the dielectric constant therebetween, and step 530 derives the relationship between two traces to equalize their base capacitances, for example $A1/d1 = A2/d2$ if $C1 = C2$ or $\in \times (A1/d1) = \in \times (A2/d2)$, step 540 adjusts the areas of the traces or the position of the grounding layer based on the relationship obtained in step 530. As a result, the touchpad sensor will have uniform base capacitances. For example, FIG. 9 shows a circular touchpad sensor 600, which comprises a first sensing layer including several traces 610 and a second sensing layer including several traces 620, the group of traces 610 and the group of traces 620 are perpendicular to each other, the trace 610 has an area A1 and is spaced from a grounding layer with a distance d1, and the trace 620 has an area A2 and is spaced from the grounding layer with a distance d2. To equalize the base capacitances of the traces 610 and 620, it is derived the relationship $A1/d1 = A2/d2$. If the distances d1 and d2 between the grounding layer and the traces 610 and 620 are different, the area of the trace closer to the grounding layer is decreased such that the traces 610 and 620 will have a same base capacitance. The grounding layer may be between or not between the first sensing layer and the second sensing layer. For example, FIGS. 10 to 12 show three cross-sectional structures 700, 750, and 800, in which the trace 610 is in a sensing layer 710, and the trace 620 is in a sensing layer 720. In FIGS. 10 and 11, the trace 610 has greater area than the trace 620, and in FIG. 12, the traces 610 and 620 have a same area. In FIG. 10, the grounding layer 730 is between the sensing layers 710 and 720, and is selected closer to the sensing layer 720 such that the distance d1 between the grounding layer 730 and the sensing layer 710 is greater than the distance d2 between the grounding layer 730 and the sensing layer 720 for the traces 610 and 620 to have a same base capacitance, since the trace 610 has greater area than the trace 620, and the relationship A1/d1=A2/d2 is to be matched. In FIG. 11, the grounding layer 730 is not between the sensing layers 710 and 720, and is selected at the side of the sensing layer 720 such that the distance d1 between the grounding layer 730 and the sensing layer 710 is greater than the distance d2 between the grounding layer 730 and the sensing layer 720 for the traces 610 and 620 to have a same base capacitance, since the trace 610 has greater area than the trace 620, and the relationship A1/d1=A2/d2 is to be matched. In FIG. 12, the grounding layer 730 is between the sensing layers 710 and 720, and is selected equally spaced from the sensing layers 710 and 720 such that the distances d1 and d2 are equal to each other for the traces 610 and 620 to have a same base capacitance, since the traces 610 and 620 have a same area and the relationship A1/d1=A2/d2 is to be matched.

In some other embodiments, two or more of the methods illustrated in the above embodiments may be combined for the compensation to a touchpad sensor, to uniform the sensed capacitive values of the traces in the same or different sensing layers when an object touches thereon.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set fourth in the appended claims.

What is claimed is:

1. A base capacitance compensation method for a touchpad sensor, comprising the steps of:
   with a first trace as a reference and the touchpad sensor being devoid of contact with an object, calculating a compensation area for a second trace; and
   electrically connecting the compensation area to the second trace for increasing a capacitance of the second trace to equalize the capacitances of the first and second traces when no object contacts the touchpad sensor and thereby establish equal base capacitances therefore.

2. The compensation method of claim 1, wherein the step of calculating a compensation area for a second trace comprises the steps of:
   calculating the capacitances of the first and second traces when no object contacts the touchpad sensor;
   calculating a difference between the calculated capacitances of the first and second traces; and
   determining the compensation area from the difference.

3. The compensation method of claim 2, wherein the compensation area is the product of the difference and a distance from where the compensation area is to a grounding layer divided by a dielectric constant.

4. The compensation method of claim 3, wherein the compensation area is in a device layer, the sensing layer including the first trace, or the sensing layer including the second trace.

5. The compensation method of claim 1, wherein the first and second traces are in a same sensing layer.

6. The compensation method of claim 1, wherein the first and second traces are respectively in two different sensing layers.

7. The compensation method of claim 1, wherein the first and second traces are perpendicular to each other.

8. The compensation method of claim 1, wherein the two traces are perpendicular to each other.

9. A base capacitance compensation method for a touchpad sensor, comprising the steps of:
   with a target capacitance value as a reference for capacitance of a trace when no object contacts the touchpad sensor, calculating two compensation areas for two traces; and
   respectively electrically connecting the compensation areas to the traces, for increasing a capacitance of the traces when the touchpad sensor is devoid of contact with an object to thereby equalize the base capacitances thereof.

10. The compensation method of claim 9, wherein the step of calculating two compensation areas for two traces comprises the step of:
    calculating the capacitance of the first trace when no object contacts the touchpad sensor;
    calculating a difference between the calculated capacitance of the first trace and the target capacitance value; and
    determining the first compensation area for the first trace from the difference.

11. The compensation method of claim 10, wherein the first compensation area is the product of the difference and a distance from where the first compensation area is to a grounding layer divided by a dielectric constant.

12. The compensation method of claim 11, wherein the first compensation area is in a device layer, the sensing layer including the first trace, or the sensing layer including the second trace.

13. The compensation method of claim 9, wherein the step of calculating two compensation areas for two traces comprises the step of:
    calculating the capacitance of the second trace when no object contacts the touchpad sensor;
    calculating a difference between the calculated capacitance of the second trace and the target capacitance value; and
    determining the second compensation area for the second trace from the difference.

14. The compensation method of claim 13, wherein the second compensation area is the product of the difference and a distance from where the second compensation area is to a grounding layer divided by a dielectric constant.

15. The compensation method of claim 13, wherein the second compensation area is in a device layer, the sensing layer including the first trace, or the sensing layer including the second trace.

16. The compensation method of claim 9, wherein the two traces are in a same sensing layer.

17. The compensation method of claim 9, wherein the two traces are respectively in two different sensing layers.

18. A base compensation method compensation for a touchpad sensor, comprising the steps of:
    calculating the base capacitances of two traces in two sensing layers respectively;
    deriving a relationship between the areas of the traces and the distances of the traces to a grounding layer for equalizing the base capacitances of the traces; and adjusting the areas of the traces or the position of the grounding layer based on the relationship.

19. The compensation method of claim 18, wherein the relationship is the area of the first trace and the distance from the first trace to the grounding layer have a ratio equal to that of the area of the second trace and the distance from the second trace to the grounding layer.

20. The compensation method of claim 18, wherein the two traces have different areas.

21. The compensation method of claim 18, wherein the two traces have a same area.

22. The compensation method of claim 18, wherein the two traces are equally spaced from the grounding layer.

23. The compensation method of claim 18, wherein the two traces are unequally spaced from the grounding layer.

24. The compensation method of claim 18, wherein the grounding layer is between the two sensing layers.

25. The compensation method of claim 18, wherein the grounding layer is not between the two sensing layers.

26. The compensation method of claim 18, wherein the two traces are perpendicular to each other.

27. A base capacitance compensation method for a touchpad sensor, comprising the steps of:
   obtaining a capacitance of a first trace when no object contacts the touchpad sensor;
   obtaining a capacitance of a second trace when no object contacts the touchpad sensor;
   electrically connecting a first compensation area to the first trace for adjusting the capacitance of the first trace to a target capacitance value; and
   electrically connecting a second compensation area to the second trace for adjusting the capacitance of the second trace to the target capacitance value, whereby the capacitances of the traces are equal and define the base capacitance thereof.

28. The compensation method of claim 27, wherein the first compensation area is derived from a difference between the capacitance of the first trace when no object contacts the touchpad sensor and the target capacitance value.

29. The compensation method of claim 28, wherein the first compensation area is the product of the difference and a distance from where the first compensation area is to a grounding layer divided by a dielectric constant.

30. The compensation method of claim 29, wherein the first compensation area is in a device layer, the sensing layer including the first trace, or the sensing layer including the second trace.

31. The compensation method of claim 27, wherein the second compensation area is derived from a difference between the capacitance of the second trace when no object contacts the touchpad sensor and the target capacitance value.

32. The compensation method of claim 31, wherein the second compensation area is the product of the difference and a distance from where the second compensation area is to a grounding layer divided by a dielectric constant.

33. The compensation method of claim 32, wherein the second compensation area is in a device layer, the sensing layer including the first trace, or the sensing layer including the second trace.

34. The compensation method of claim 27, wherein the first and second traces are in a same sensing layer.

35. The compensation method of claim 27, wherein the first and second traces are respectively in two different sensing layers.

36. The compensation method of claim 27, wherein the first and second traces are perpendicular to each other.

* * * * *